(12) United States Patent
Yu

(10) Patent No.: US 9,273,488 B1
(45) Date of Patent: Mar. 1, 2016

(54) POSITIVE LOCKING KEEPER

(71) Applicant: Jung Ung Yu, Valencia, CA (US)

(72) Inventor: Jung Ung Yu, Valencia, CA (US)

(73) Assignee: Avibank Manufacturing, Inc., North Hollywood, CA (US)

( * ) Notice: Subject to any disclaimer, the term of this patent is extended or adjusted under 35 U.S.C. 154(b) by 24 days.

(21) Appl. No.: 13/941,975

(22) Filed: Jul. 15, 2013

(51) Int. Cl.
*E05B 15/02* (2006.01)
*E05B 15/00* (2006.01)

(52) U.S. Cl.
CPC .............. *E05B 15/025* (2013.01); *E05B 15/02* (2013.01); *E05B 15/024* (2013.01); *E05B 15/0245* (2013.01)

(58) Field of Classification Search
CPC ....... E05B 15/00; E05B 15/02; E05B 15/024; E05B 15/0245; E05B 2015/027; E05B 15/025
USPC ............................... 292/340, 341.18, DIG. 60
See application file for complete search history.

(56) References Cited

U.S. PATENT DOCUMENTS

| | | | | |
|---|---|---|---|---|
| 2,265,691 A * | 12/1941 | Hogg | ........................ | 292/341.18 |
| 2,669,477 A * | 2/1954 | Jewell | ........................ | 292/341.18 |
| 2,904,141 A * | 9/1959 | Henrichs | ........................ | 403/321 |
| 4,183,564 A * | 1/1980 | Poe | ........................ | 292/113 |
| 4,220,364 A * | 9/1980 | Poe | ........................ | 292/341.18 |
| 4,320,912 A * | 3/1982 | Grace et al. | ........................ | 292/341.18 |
| 4,478,446 A * | 10/1984 | Duran | ........................ | 292/341.18 |
| RE31,935 E * | 7/1985 | Poe | ........................ | 292/113 |
| 4,530,529 A * | 7/1985 | Poe et al. | ........................ | 292/113 |
| 4,538,843 A * | 9/1985 | Harris | ........................ | 292/113 |
| 4,602,812 A * | 7/1986 | Bourne | ........................ | 292/113 |
| 4,691,952 A * | 9/1987 | Harmon | ........................ | 292/341.18 |
| 4,798,408 A * | 1/1989 | Harmon et al. | ........................ | 292/341.18 |
| 4,852,923 A * | 8/1989 | Harmon et al. | ........................ | 292/341.18 |
| 4,906,037 A * | 3/1990 | Stammreich et al. | ........................ | 292/341.18 |
| 5,016,931 A * | 5/1991 | Jackson | ........................ | 292/341.18 |
| 5,226,302 A * | 7/1993 | Anderson | ........................ | 70/159 |
| 6,382,690 B1 * | 5/2002 | Dessenberger, Jr. | ........................ | 292/341.18 |
| 6,592,156 B2 * | 7/2003 | Levine | ........................ | 292/23 |
| 8,752,871 B2 * | 6/2014 | Rechberg et al. | ........................ | 292/340 |

* cited by examiner

*Primary Examiner* — Carlos Lugo

(74) *Attorney, Agent, or Firm* — R. Scott Kimsey, Esq.; Klein DeNatale Goldner et al.

(57) ABSTRACT

A positive locking keeper for use with an aircraft panel latch assembly having a hook for engaging the positive locking keeper includes a keeper housing having a central opening, and a coupling having a head and a shaft extending therefrom. The head engages the latch assembly and the shaft extends through the housing with the head disposed on the first side. A detent pin is disposed within an aperture of the keeper housing. The positive locking keeper also includes a nut positioned on the second side of the keeper housing. The shaft engaged the nut. The nut includes indentations on a peripheral edge to receive a portion of the detent pin. In a first position, the detent pin engages one of the indentations and prevents rotation of the nut. In a second position, the detent pin does not engage the indentations and the nut is able to rotate.

10 Claims, 10 Drawing Sheets

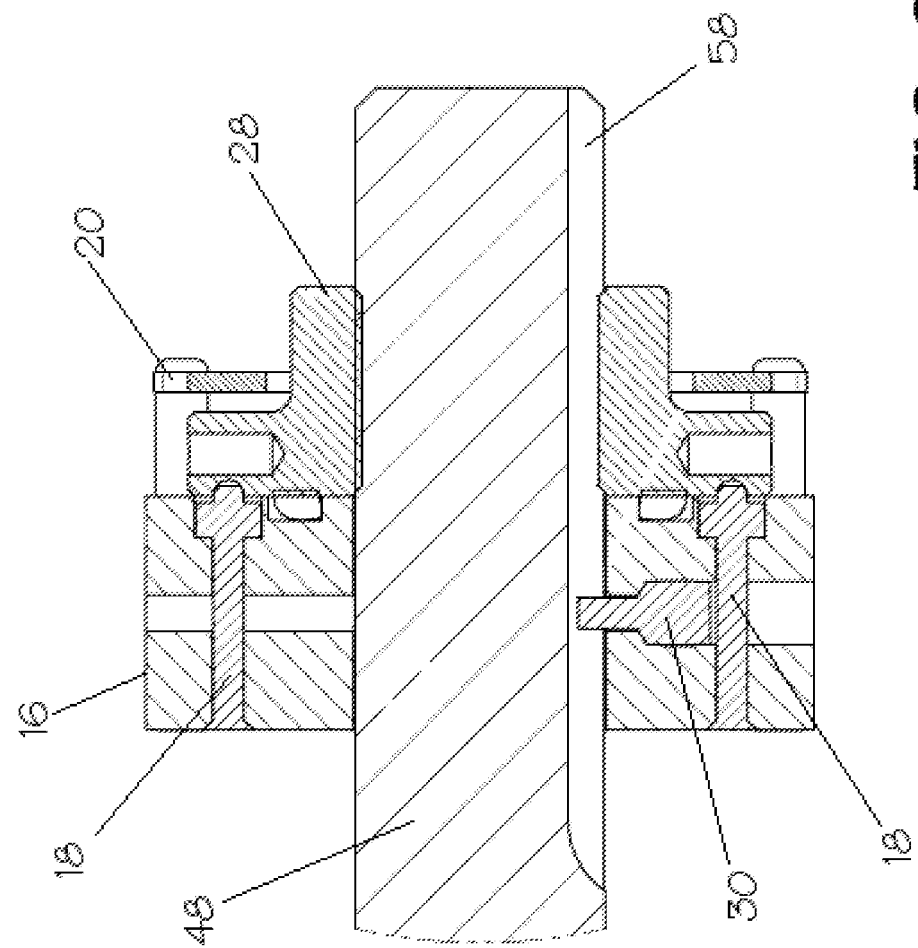

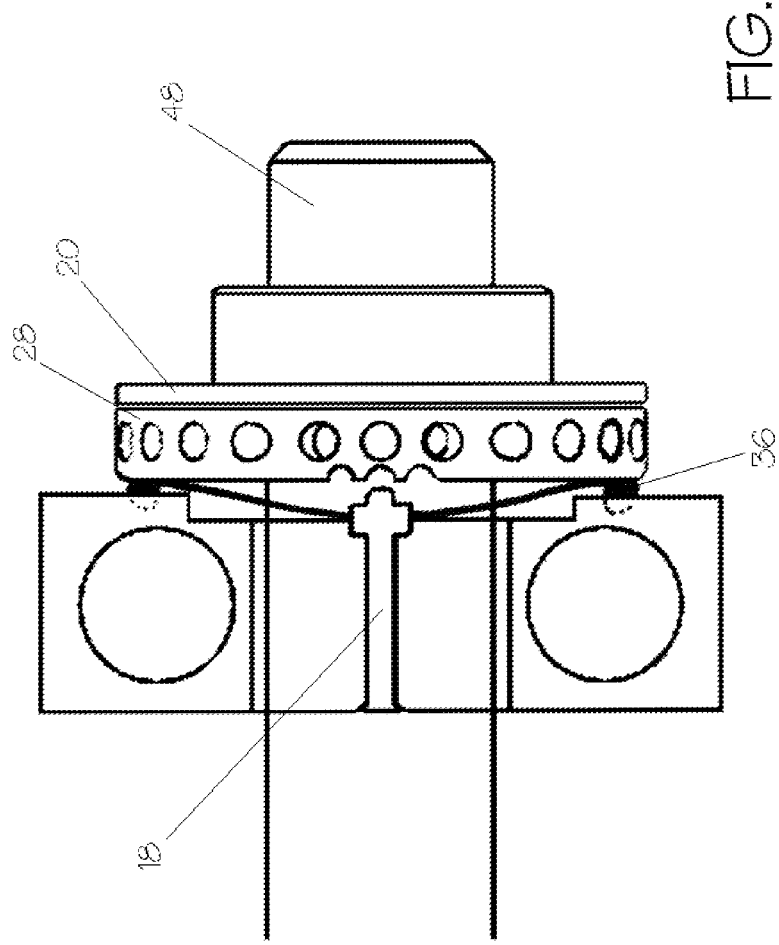

POSITIVE LOCKING KEEPER

RELATED APPLICATIONS

Not Applicable.

BACKGROUND OF THE INVENTION

1. Field of the Invention

The present invention relates generally to a locking keeper, and more specifically to a positive locking keeper for use with aircraft panel latch assemblies.

2. Background

Latches are used on the exterior surfaces of aircraft, where it is important that the latch present a flush surface. Such latches are generally used with a keeper or locking pin on an opposing surface for engaging the latch. It is important that the latch and the keeper be tightly secured, particularly given the vibration and rattling to which the latch and keeper are exposed during travel. It is important that the keeper be adjustable when necessary, and when not engaging the latch, but that it not lose adjustment when the latch and keeper are engaged.

SUMMARY OF THE INVENTION

The present invention provides a positive locking keeper for use with an aircraft panel latch assembly having a hook for engaging the positive locking keeper. The positive locking keeper includes a keeper housing defining a central opening therethrough, and a coupling having a head and a shaft extending therefrom. The head is designed to engage the latch assembly and the shaft extends through the central opening of the keeper housing with the head disposed on the first side. A detent pin is disposed within an aperture of the keeper housing. The positive locking keeper also includes a nut positioned on the second side of the keeper housing. A portion of the shaft extends through the central opening of the nut and is engaged therewith. The nut includes a plurality of indentations on a peripheral edge, each sized and shaped to receive a portion of the detent pin. When the nut is in a first position, the detent pin engages one of the indentations and prevents rotational movement of the nut. When the nut is in a second position, the detent pin does not engage any of the indentations and the nut is able to rotate freely.

The nut may include threads and may be made up to corresponding threads on the shaft. When there is no load on the coupling, the wave spring biases the nut away from the keeper housing. When a load is placed on the coupling in a direction that moves the nut toward the keeper housing, the biasing force of the wave spring is overcome by the nut.

A wave spring may be positioned between the keeper housing and the nut, the wave spring serving to bias the nut away from the keeper housing.

The positive locking keeper may also include a spring disposed within the opening in the keeper housing that holds the detent pin. The spring biases the detent pin away from the keeper housing.

The positive locking keeper may include a plate fixedly attached to the keeper housing. The nut is positioned between the plate and the housing. The plate includes a central opening for receiving a portion of the nut and the shaft therethrough.

The shaft may include a groove and the keeper housing may include an alignment pin. A portion of the alignment pin protrudes into the central opening of the keeper housing. This portion of the alignment pin is received into the groove of the shaft when the shaft is inserted through the central opening of the keeper housing.

The head of the coupling may be a clevis that includes first and second opposing arms extending away from the shaft. The first and second arms define first and second clevis pin openings, respectively. A clevis pin extends from the first clevis pin opening to the second clevis pin opening.

The nut may include a plurality of tool engagement openings spaced along a peripheral edge of the nut.

The invention also provides a method for achieving positive locking of a keeper associated with an aircraft panel latch assembly. The aircraft panel latch assembly is moveable between open and closed positions and includes a hook for engaging the coupling of the positive locking keeper. The method includes the step of engaging the coupling of the positive locking keeper with the hook of the latch assembly while the latch assembly is in the open position, and then moving the latch assembly to the closed position. When the latch assembly is moved to the closed position, the adjustment nut of the locking keeper is moved from a position of disengagement with a detent pin of the positive locking keeper to a position of engagement with the detent pin of the positive locking keeper, so that the nut goes from being freely rotatable to being unable to rotate.

BRIEF DESCRIPTION OF THE DRAWINGS

FIG. 9 is a cross-section view of an embodiment of a positive locking keeper.

FIG. 10 is a side view of an embodiment of a positive locking keeper shown when an associated latch assembly is in the open position.

DETAILED DESCRIPTION OF THE INVENTION

Figure 1:
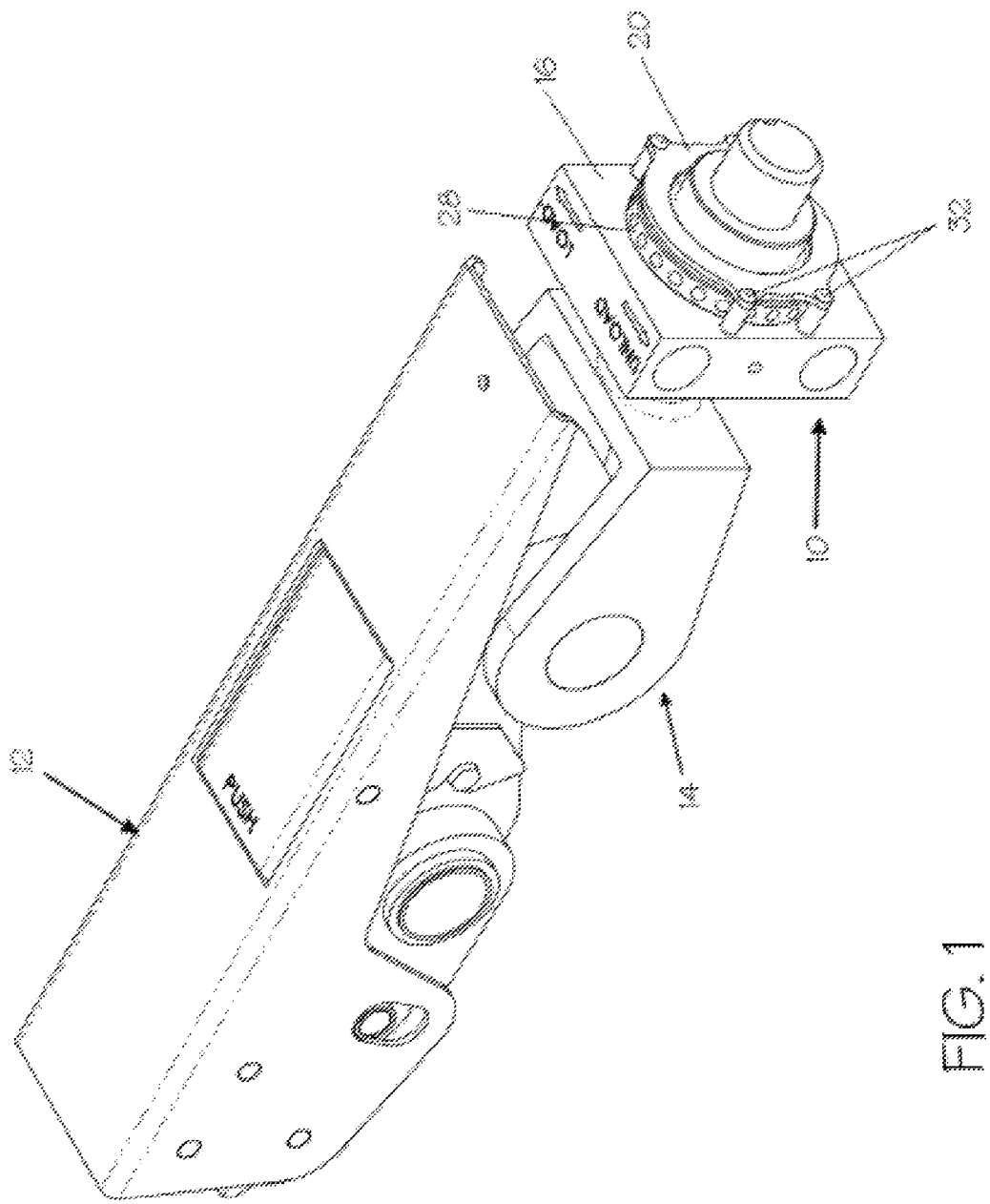
FIG. 1 is a perspective view of an embodiment of a positive locking keeper, along with a latch assembly, shown in the closed position.

Turning to the drawings, wherein like numerals indicate like parts, FIG. 1 is a perspective view of a positive locking keeper 10 and latch assembly 12. Positive locking keeper 10 includes keeper housing 16, adjustment nut 28 (which may be referred to herein simply as "nut 28"), plate 20, and rivets 32. Positive locking keeper 10 engages a coupling 14 that engages positive locking keeper 10. Latch assembly 12 is shown in a closed position, engaging coupling 14 and placing a load on positive locking keeper 10. Coupling 14 includes a head that engages the latch assembly and a shaft that engages the positive locking keeper. It should be noted that while the embodiments shown in the drawings show the head of coupling 14 as a clevis and clevis pin, coupling 14 may be comprised of any suitable structure, including, for example, an eye bolt.

Figure 2:
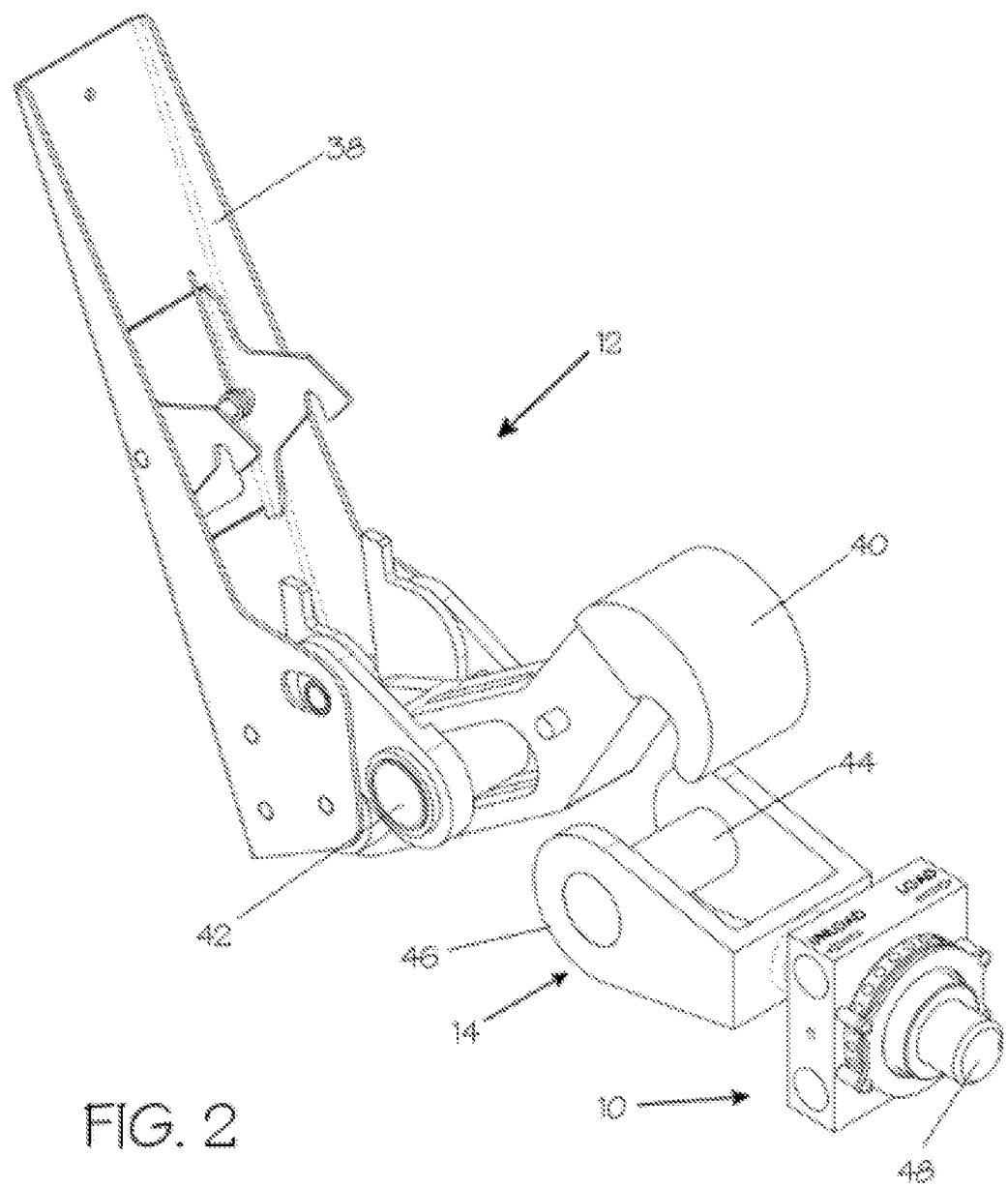
FIG. 2 is a perspective view of an embodiment of a positive locking keeper, along with a latch assembly, shown in the open position.

FIG. 2 shows positive locking keeper 10 and latch assembly 12, with latch assembly 12 in an open position. As can be seen, coupling 14 includes a head (formed in the embodiments shown in the figures by a clevis 46 and a clevis pin 44). Coupling 14 also includes a shaft 48 that extends away from clevis 46. Latch assembly 12 includes a latch handle 38, a hook 40, and a mounting bushing 42, which forms a pivot point for latch assembly 12. Hook 40 engages clevis pin 44 of coupling 14, allowing latch assembly 12 to exert force on coupling 14, forcing nut 28 flush with keeper housing 16 when latch assembly 12 is closed, as described in greater detail below.

Figure 3:
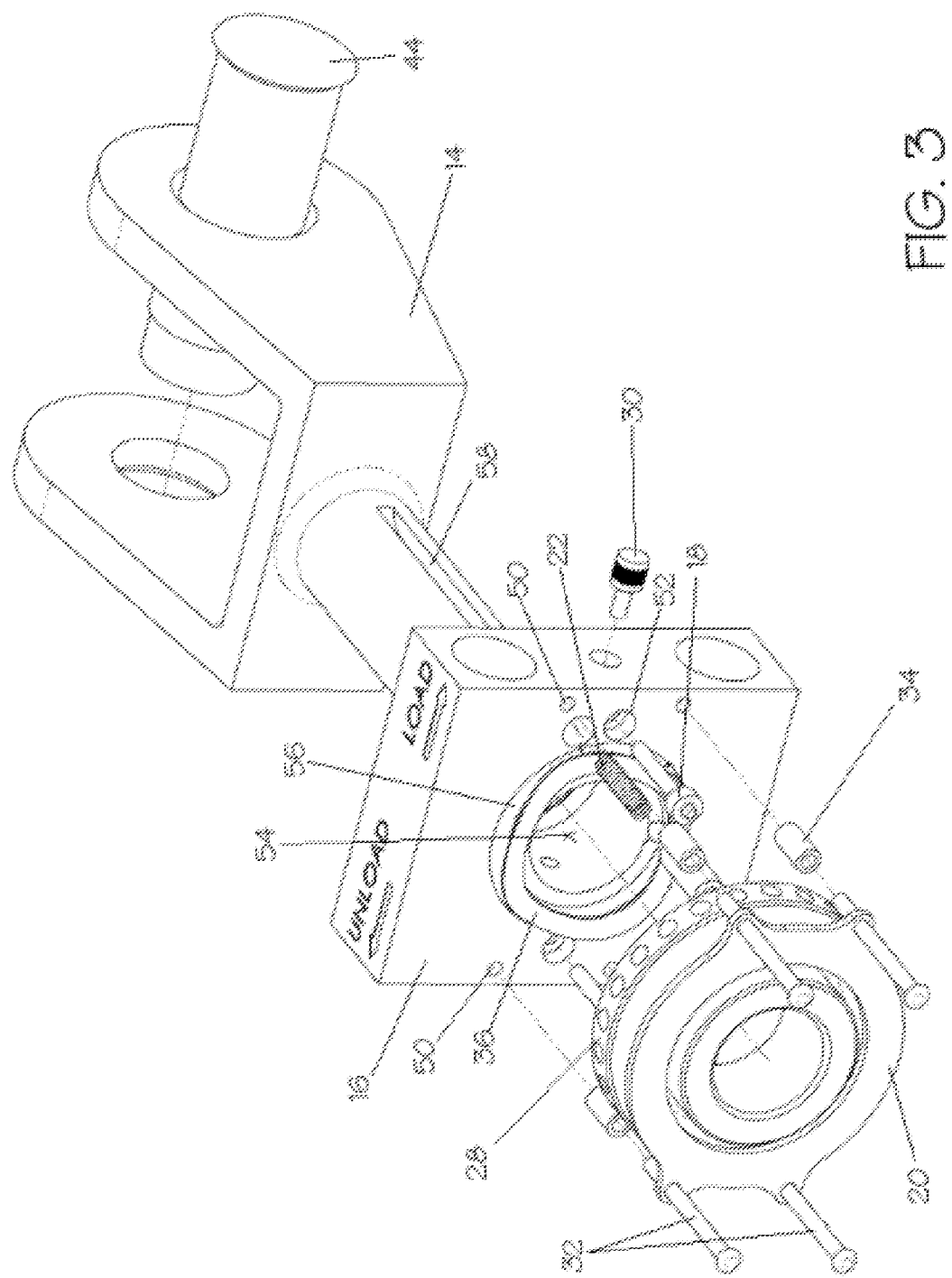
FIG. 3 is an exploded perspective view of an embodiment of a positive locking keeper.

FIG. 3 provides an exploded view of positive locking keeper 10. Keeper housing 16 includes a central opening 54 extending therethrough. Extending around the perimeter of central opening 54 is annular ring 56, which is recessed into keeper housing 16. Annular ring, or recess, 56 receives wave spring 36, which biases nut 28 away from keeper housing 16. Nut 28 is held in place by plate 20, which attaches to keeper housing 16 using rivets 32 and bushings 34, as shown in FIG. 3, or by use of any other suitable fasteners. When plate 20 is attached to keeper housing 16, nut 28 is held between plate 20 and keeper housing 16, but is held loosely enough that nut 28 can rotate freely unless its rotation is prevented by one or more detent pins 18.

Figure 4:
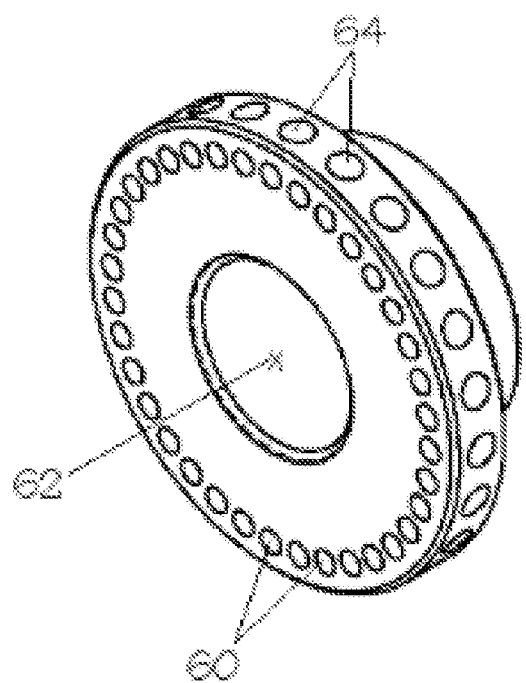
FIG. 4 is a perspective view of an embodiment of a nut for use with a positive locking keeper.

FIG. 4 provides a perspective view of nut 28 in which the surface of nut 28 facing detent pins 18 is shown. Indentations 60 in that surface of nut 28 are sized and shaped to receive a portion of the detent pins 18 when adjacent thereto. Openings 64 are provided around a peripheral edge of nut 28, allowing engagement of nut 28 with a tool (not shown) that can be used to rotate nut 28 in either of two directions when nut 28 is free to rotate. Also shown is central opening 62, which is sized and shaped to receive shaft 48 of coupling 14 in threaded engagement therethrough. It is contemplated that nut 28 can be made up to, or fixedly attached to, shaft 48 in any suitable manner, such that lateral movement of shaft 48 results in a corresponding movement of nut 28. Rotation of nut 28 causes a linear movement of coupling 14 for pre-load adjustment thereof.

Figure 5:
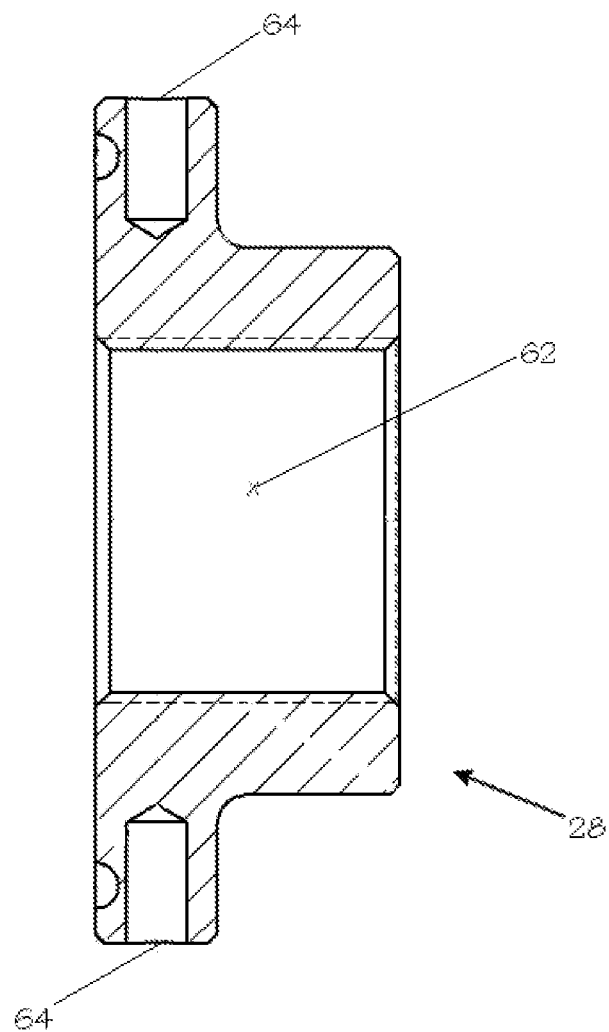
FIG. 5 is a cross-section view of an embodiment of a nut for use with a positive locking keeper.

FIG. 5 provides a cross-section view of nut 28. As can be seen in both FIGS. 4 and 5, the width of nut 28 is greater at the end where tool engagement openings 64 are located, and narrower at the opposing end. This allows plate 20 to slide over the narrower portion of the nut, but to be prevented from sliding further by the wider portion. Plate 20 is tightened against the wider portion of nut 28 sufficiently to hold nut 28 in place, but also to allow rotation of nut 28 in the space between plate 20 and keeper housing 16 when nut 28 is sufficiently removed from keeper housing 16 to disengage detent pin 18.

Figure 6:
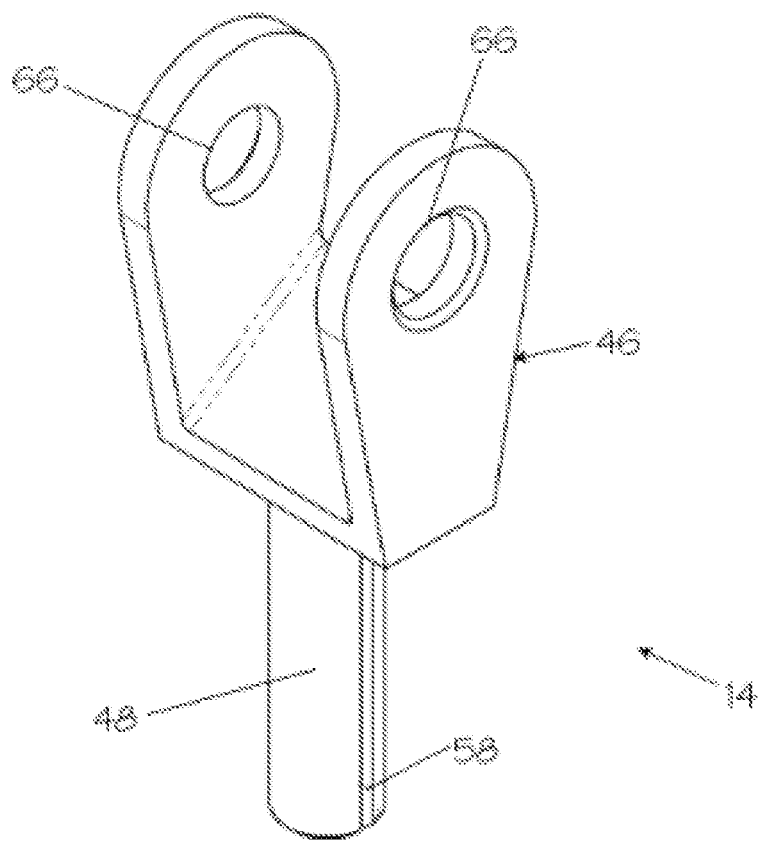
FIG. 6 is a perspective view of an embodiment of a clevis and shaft which may be used with the positive locking keeper.

FIG. 6 provides a perspective view of coupling 14. Clevis pin 44 is not present in the drawing. Clevis 46 of coupling 14 has two extending, opposing arms, each with a clevis pin opening 66 near the terminal end thereof. Clevis pin 44 is inserted through both clevis pin openings 66 to form the completed clevis 46 as shown, for example, in FIG. 2. Shaft 48 of coupling 14 extends from clevis 46 in the opposite direction of the opposing, extending arms thereof. It should be noted that the shaft 48 of coupling 14 is threaded for engagement with nut 28, which has a central opening that is threaded so as to engage shaft 48.

Figure 7:
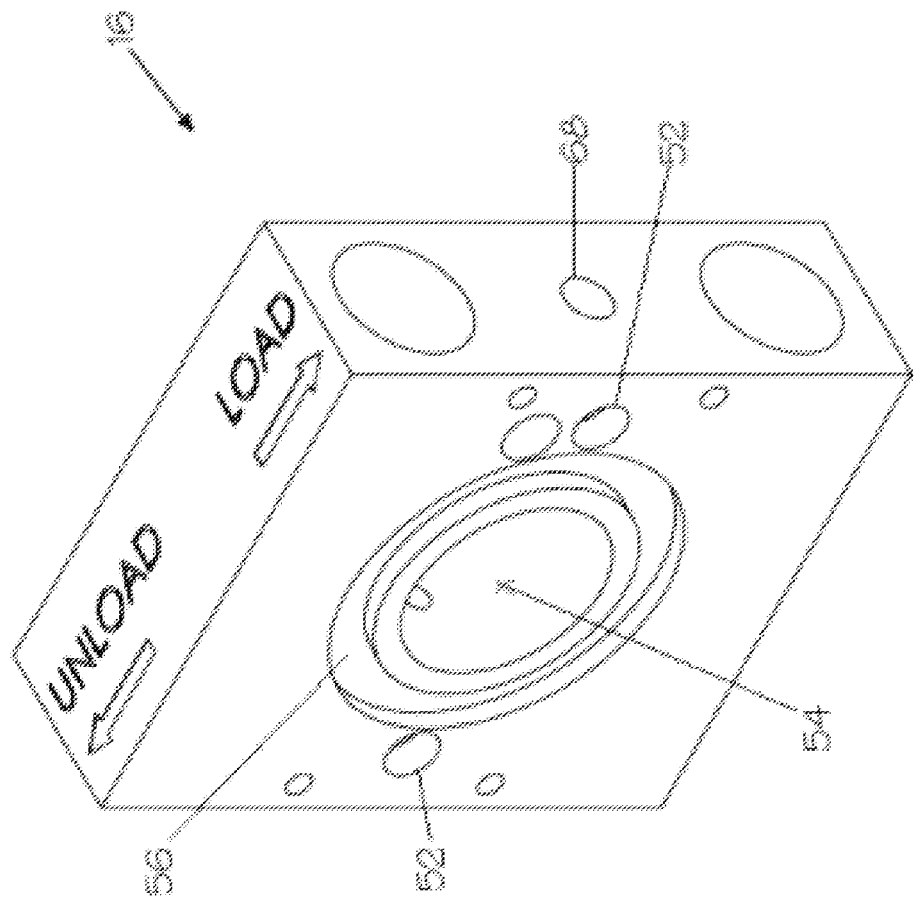
FIG. 7 is a perspective view of an embodiment of a keeper housing.

FIG. 7 provides a perspective view of keeper housing 16. A front surface of keeper housing 16 is shown, providing details of the structure thereof. Keeper housing opening 54 is shown, sized and shaped to receive shaft 48. Detent openings 52 are shown, as is annular ring 56, which receives wave spring 36 when positive locking keeper 10 is assembled. Also shown is a side edge of keeper housing 16, having a pin opening 68 for receipt of alignment pin 30 therein.

Figure 8:
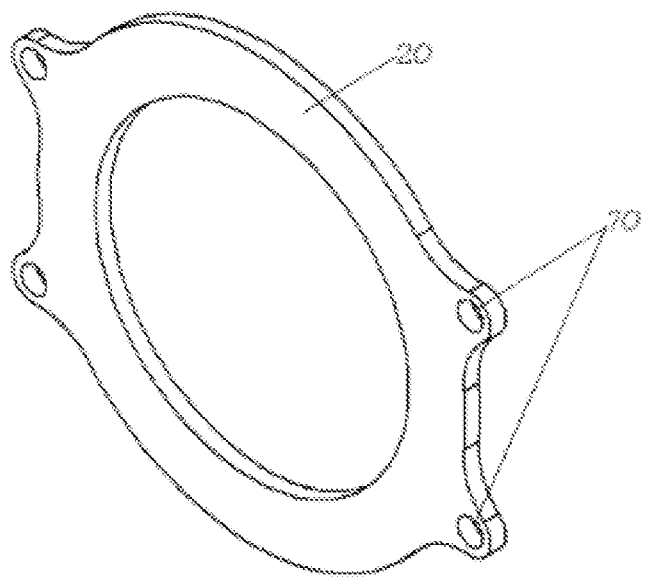
FIG. 8 is a perspective view of an embodiment of a plate which may be used with the positive locking keeper.

FIG. 8 is a perspective view of plate 20. Plate rivet openings 70 are shown. These are sized and shaped to receive rivets 32, which pass through plate rivet openings 70 and are received into housing rivet openings 50 when positive locking keeper 10 is assembled.

FIG. 9 is a cross-section view of positive locking keeper 10, assembled with coupling 14 and nut 28 in place. Shaft 48 is received through keeper housing opening 54, with groove 58 oriented so as to receive alignment pin 30. Alignment pin 30 is held in place by one of detent pins 18, which prevents alignment pin 30 from moving backwards through pin opening 68 and out of keeper housing 16. Also shown in FIG. 9 is plate 20, which is attached to keeper housing 16 with nut 28 therebetween. In the figure, nut 28 is flush with keeper housing 16, with portions of detent pins 18 being received into indentations 60 of nut 28 to prevent rotational movement of nut 28.

FIG. 10 depicts positive locking keeper 10 when the associated latch assembly is in an open position. Shown are shaft 48, plate 20, nut 28, a detent pin 18, and wave spring 36. As shown in FIG. 10, wave spring 36 biases detent pin 18 away from nut 28 when the latch assembly is in the open position. As further described below, when the latch assembly is in the closed position the take-up force from the latch assembly overcomes the force of wave spring 36 and detent pin 18 engages an indentation in nut 18.

Operation of positive locking keeper 10 will now be described. When latch assembly 12 is in the open position, no load is placed on coupling 14. Shaft 48 of coupling 14 extends through keeper housing 16, oriented such that groove 58 receives alignment pin 30. Plate 20 holds nut 28 in place, but because there is no load on coupling 14, the biasing action of wave spring 36 pushes nut 28 away from keeper housing 16 sufficiently so that detent pins 18 do not engage indentations 60 on the rear surface of nut 28. Because indentations 60 are not engaged by detent pins 18, nut 28 is able to rotate in the space between plate 20 and keeper housing 16. Rotation of nut 28 in a clockwise or counter-clockwise direction results in a corresponding linear movement of coupling 14, as nut 28 is in threaded engagement with shaft 48.

When latch assembly 12 closed, coupling 14 is forced in the direction of latch assembly 12, causing a corresponding movement of the nut toward the keeper housing. The take-up force from latch assembly 12 overcomes the biasing force of wave spring 36, forcing nut 28 flush against the surface of keeper housing 16. When nut 28 is flush with keeper housing 16, detent pins 18 engage indentations 60 of nut 28 and prevent rotational movement of nut 28. Nut 28 will not rotate unless the nose portions of detent pins 18 are sheared. Positive locking keeper 10 remains in this configuration until latch assembly 12 is placed in an open position, at which time wave spring 36 again biases nut 28 away from the surface of keeper housing 16 and nut 28 is allowed rotation movement once more.

The foregoing description and accompany figures are exemplary and are not intended to limit the present invention. Various modifications to what is shown and described will be readily apparent to those of skill in the art upon reading this disclosure, and it is contemplated that such modifications remain within the spirit and scope of the invention.

Having thus described the preferred embodiment of the invention, what is claimed as new and desired to be protected by Letters Patent includes the following:

The invention claimed is:

1. A positive locking keeper for use with an aircraft panel latch assembly, the latch assembly having a hook for engaging the positive locking keeper, the positive locking keeper comprising:
   a keeper housing comprising a first side and a second side and defining a central opening therethrough;
   a coupling comprising a head and a shaft extending therefrom, the head for engaging the latch assembly and the shaft extending through the central opening of the keeper housing with the head disposed on the first side;
   a detent pin disposed within an aperture of the keeper housing;
   a biasing member disposed within the aperture of the keeper housing containing the detent pin, the biasing member biasing the detent pin outwardly;
   a nut having a central opening defined therethrough, the nut positioned on the second side of the keeper housing such that a portion of the shaft extends through the keeper housing and through the central opening of the nut and is engaged therewith, the nut comprising a plurality of indentations sized and shaped to receive a portion of the detent pin; and
   a plate fixedly attached to the housing such that the nut is positioned between the plate and the keeper housing, the plate defining a central opening for receiving a portion of the nut and shaft therethrough,
   wherein when the latch assembly is in a closed position, a take-up force from the latch assembly causes the detent pin to engage one of said plurality of indentations in the nut and prevents rotational movement of the nut, and when the latch assembly is in an open position, the detent pin does not engage any of said plurality of indentations in the nut.

2. The positive locking keeper of claim 1, wherein the biasing member is a wave spring.

3. The positive locking keeper according to claim 2, wherein the nut comprises threads and is made up to corresponding threads on an exterior surface of the shaft, wherein when there is no load on the coupling, the wave spring biases the nut away from the keeper housing, and when a load is placed on the coupling in a direction that moves the nut toward the keeper housing, the biasing force of the wave spring is overcome by the nut.

4. The positive locking keeper of claim 1, wherein the biasing member is a spring.

5. The positive locking keeper according to claim 1, wherein the shaft comprises a groove and the keeper housing comprises an alignment pin, a portion of the alignment pin protruding into the central opening of the keeper housing to be received in the groove of the shaft when the shaft is inserted through the central opening of the keeper housing.

6. The positive locking keeper according to claim 1, wherein the head of the coupling is a clevis comprising a first arm extending away from the shaft, and a second, opposing arm extending away from the shaft, the first arm defining a first clevis pin opening therethrough and the second arm defining a second clevis pin opening therethrough, the head further comprising a clevis pin extending from the first clevis pin opening to the second clevis pin opening.

7. The positive locking keeper according to claim 1, wherein the nut further comprises a plurality of tool engagement openings spaced along a peripheral edge thereof.

8. A positive locking keeper for use with an aircraft panel latch assembly, the latch assembly having a hook for engaging the positive locking keeper, the positive locking keeper comprising:
   a keeper housing comprising a front surface and a rear surface and defining a central opening therethrough, the keeper housing further comprising an annular groove in the front surface thereof, the annular groove extending around the central opening, and defining at least one detent pin aperture in the front surface thereof;
   a plate fixedly attached to the front surface of the keeper housing, the plate defining a central opening therethrough;
   a nut positioned between the plate and the front surface of the keeper housing, and comprising a first end, a plurality of indentations defined therein, and a second end, the second end extending from the first end and being narrower than the first end, the nut further defining a central opening therethrough;
   a wave spring within the annular groove, the wave spring biasing the nut away from the keeper housing;
   a detent pin contained within the detent pin aperture, a portion of the detent pin sized and shaped to be received in one of said plurality of indentations;
   a coupling comprising a clevis and a shaft, the clevis comprising a clevis pin for engaging the hook of the latch assembly;
   wherein the shaft extends through the central opening of the keeper housing, the central opening of the nut, and the central opening of the plate, the shaft being engaged with the nut such that rotation of the nut causes a corresponding linear motion of the coupling,
   and further wherein when the latch assembly is in a closed position, a take-up force from the latch assembly causes the detent pin to engage one of said plurality of indentations in the nut and prevents rotational movement of the nut, and when the latch assembly is in an open position, the detent pin does not engage any of said plurality of indentations in the nut.

9. A method for achieving positive locking of a keeper associated with an aircraft panel latch assembly, the aircraft panel latch assembly being moveable between open and closed positions and comprising a hook for engaging a coupling of the positive locking keeper, the method comprising the steps of:
   a) engaging the coupling of the positive locking keeper with the hook of the aircraft panel latch assembly while the aircraft panel latch assembly is in the open position;
   b) moving the latch assembly to the closed position, causing the hook to place a load on the coupling of the positive locking keeper, a take-up force from the latch assembly moving an adjustment nut of the positive locking keeper from a position of disengagement with a detent pin of the positive locking keeper to a position of engagement with the detent pin such that rotation of the adjustment nut is prevented.

10. The method according to claim 9 wherein the coupling comprises a head and a shaft extending from the head, and a keeper housing defining a central opening therethrough, the detent pin contained within an aperture of the keeper housing, and wherein the shaft extends through the keeper housing such that the head of the shaft is on a first side of the keeper housing and the nut is made up with the shaft on the second side of the keeper housing,
   wherein moving the latch assembly to the closed position causes lateral movement of the shaft of the coupling, pulling the nut toward the keeper housing and engaging an aperture in a side of the nut with the detent pin such that the nut is prevented from rotating.

* * * * *